UNITED STATES PATENT OFFICE.

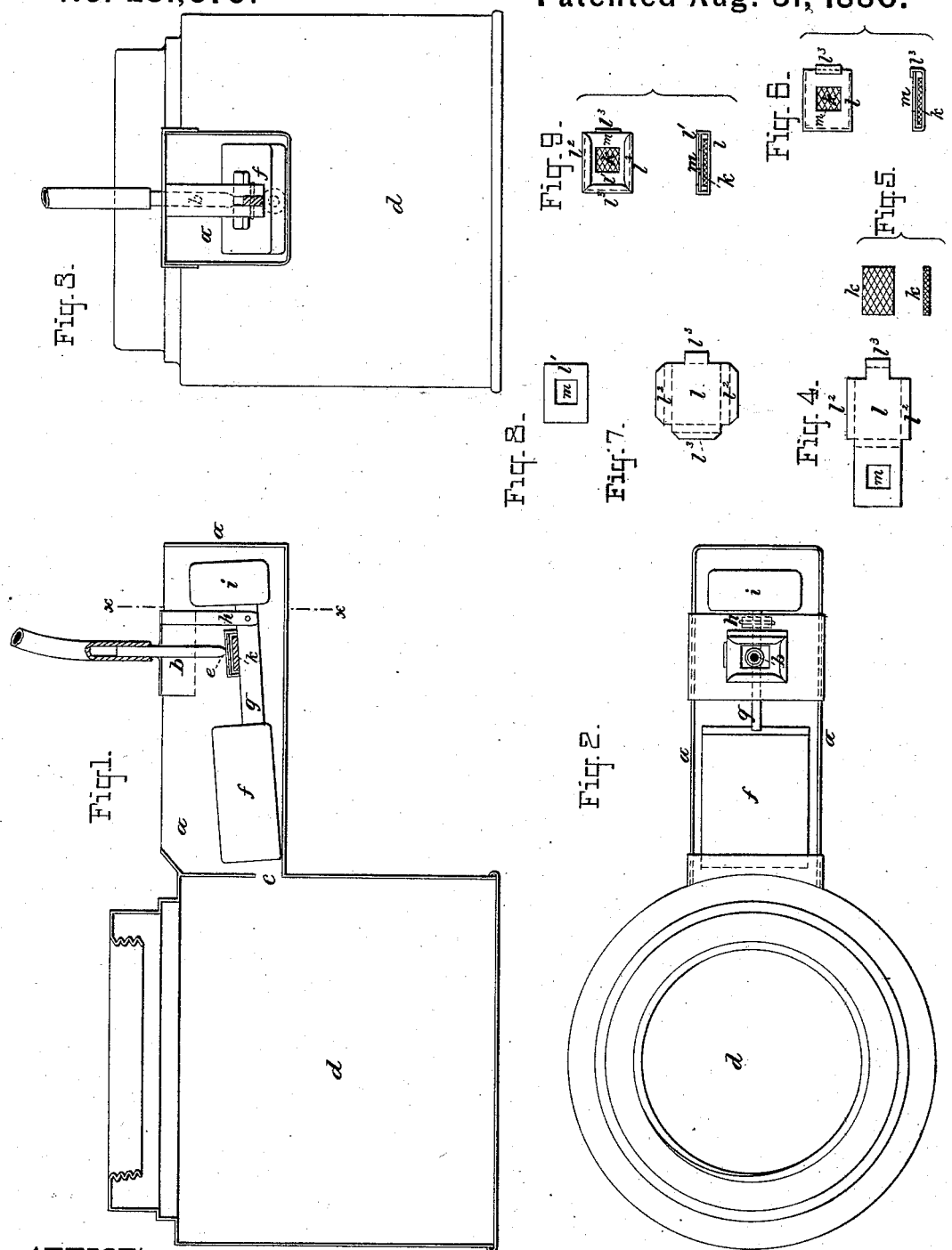

WILLIAM W. HOPKINSON, OF LONDON, ENGLAND.

APPARATUS FOR CONTROLLING THE SUPPLY OF COMBUSTIBLE LIQUIDS FOR LIGHTING.

SPECIFICATION forming part of Letters Patent No. 231,670, dated August 31, 1880.

Application filed May 14, 1880. (No model.) Patented in England February 11, 1880.

*To all whom it may concern:*

Be it known that I, WILLIAM WALTER HOPKINSON, of London, England, have invented certain new and useful Improvements in the Means or Apparatus for Controlling the Supply of Combustible Liquids for Lighting or Heating Purposes, of which the following is a specification.

My invention relates to means or apparatus for controlling the supply of oil or other combustible liquid to lamps or to heating apparatus when the oil or liquid flows through a pipe or tube from a reservoir into a receiving chamber or vessel, from which chamber it passes to the lamp or heating apparatus.

My controlling apparatus is represented in the annexed drawings, of which—

Figure 1 is a vertical section; Fig. 2, a plan; and Fig. 3 a section through the line $x\ x$ of Fig. 1. Figs. 4 to 9, inclusive, illustrate a sheet-metal holder for the india-rubber stopper or packing, and also the said packing.

$a$ is the receiving-chamber of the apparatus, which is supplied with oil from a reservoir placed at any suitable position by means of a pipe or tube, $b$, which protrudes into the receiving-chamber, as shown.

From the receiving-chamber the oil flows through a hole, $c$, (either directly or through a pipe,) to the reservoir $d$ of the lamp or heating apparatus, which reservoir may be of any required capacity and of any desired form.

The orifice $e$ of the pipe or tube $b$, out of or through which the oil or liquid flows into the receiving-chamber, is, by preference, made very small, so as to prevent too great a flow of the oil or liquid and too much resistance to the closure of the opening by the float-valve.

The pipe or tube $b$ has its outside diameter reduced or beveled at the orifice end, so as to leave its edge almost sharp—that is, nearly to a cutting-edge—for the purpose of preventing leakage by offering as small a surface and as little resistance as is practicable to the vulcanized india-rubber or other elastic material attached to the float, to be next described.

The receiving-chamber is provided with a float, $f$, for the purpose of controlling or stopping the flow of oil or liquid to the lamp. This float is an air-chamber or other floating body attached to one end of a lever, $g$, which has a hole or slot to allow of its being jointed or suspended to a rod or fulcrum, $h$. A weight, $i$, is attached to the other end of the lever for the purpose of nearly balancing the float, and thereby rendering it very sensitive, so that it will act very readily.

Vulcanized india-rubber or other suitable elastic material $k$ is attached to the lever $g$ (or it may be attached to the float $f$) on the side next to and opposite the small orifice $e$ in the pipe or tube.

When the oil or liquid flowing into the receiving-chamber $a$ rises to a certain level it causes the float $f$ to rise also, and the vulcanized india-rubber $k$ is thus pressed against the orifice $e$ in the pipe or tube, and controls the flow of oil or liquid if the lamp is burning, or stops such flow if the lamp is not burning.

The vulcanized india-rubber $k$ should be attached to the lever or float in such manner as to allow of its swelling, which it will do under the action of the oil, and one good way in which to attach it is as follows: I take a strip of tin or other metal, (see $l$, Fig. 4,) rather wider than the india-rubber and more than double its length, and having an aperture, $m$, rather smaller in area than the india-rubber, which is shown at $k$, Fig. 5. I turn up the sides $l^2$ of the strip, then fold one half of the strip over the other, the aperture $m$ being in the upper half. The lower half is then soldered or otherwise fixed to the lever or the float. I place the rubber $k$ between the two halves of the tin, and then turn up the end $l^3$ of the strip (see Fig. 6) so as to securely hold the rubber, while allowing it to expand in thickness and also in area to the larger area of the folded strip.

Another way, which is represented in Figs. 7, 8, 9, consists in having two pieces of metal, $l$, Fig. 7, and $l'$, Fig. 8. I fold over the edges $l^2$ of the piece $l$ and fix it to the lever or the float, then place the piece $l'$ under the edges $l^2$, with the rubber between these two pieces, and turn up the edges $l^3$, as seen in Fig. 9, so as to hold the rubber in place.

I have stated that the rubber expands under the action of the oil. It may therefore be found convenient to submit it to the action of oil before placing it in the metal pieces, Fig. 4, or Figs. 7 and 8, and in this case it will not be necessary to leave so much space for it to expand when held by the metal pieces.

The reservoir which supplies the receiving-chamber $a$ with the oil should have a filter over the entrance of the pipe or tube $b$, to prevent small particles entering. There may also be a filter in the pipe or tube itself near to the receiving-chamber $a$.

If the pipe or tube, or that portion of it which protrudes into the receiving-chamber, be very small in outside diameter—that is to say, if it be made of thin metal—it need not be beveled on its outside edge; but as the flow of the oil from the pipe has to be stopped by the rubber the outside diameter of the pipe at the orifice should be as small as practicable. Any convenient size of pipe may, however, be used; but when the orifice $e$ is not small a corresponding extra pressure is required from the float to cause the india-rubber to stop the flow of oil. It is therefore essential that the rubber shall always remain flat. Now if the rubber be rigidly fixed to the lever or float before being placed under the action of the oil for a sufficient time it will swell, so as not to remain flat, and consequently, if the orifice $e$ be large, the rubber may not stop the flow of oil unless it be loosely attached. It is therefore important, particularly when the orifice $e$ is not very small, to attach the rubber loosely, and I prefer to attach it by either of the means described.

The float $f$ being nearly balanced by the weight $i$, it is exceedingly sensitive, the result of which is that it acts most readily and controls the flow of oil to a nicety. The oil in the lamp-reservoir $d$ is thus kept at one uniform level, and therefore the light does not diminish and the wick does not become charred to nearly the same extent as when the oil-level varies. There is no leakage of oil, and therefore no waste-pipe is required.

I am aware that floats and valves have been arranged inside the reservoirs of lamps to regulate the influx of oil and to maintain it at a uniform height; but I am not aware that a receiving-chamber independent of the reservoir of a lamp or heating apparatus and provided with a balanced float-valve has ever been employed, or that the means herein described for retaining the rubber stopper loosely in place has ever been before used.

What I claim, and desire to secure by Letters Patent, is—

1. The combination, with the reservoir of a lamp or heating apparatus, of the independent receiving-chamber, the oil-pipe arranged to enter the same, as shown, the float attached to the pivoted lever, the said lever with its counter-balance, and the rubber stopper or packing $k$, loosely mounted on the lever opposite the mouth of the oil-pipe in the fixed sheet-metal case or cage described and shown, all as set forth.

2. The combination, to form a stopper or packing for an automatic valve for controlling the admission of liquids to the reservoirs of lamps and heating apparatus, of the rubber piece or plate $k$, inclosed loosely within the sheet-metal case, and the said case, having an opening, $m$, to expose the inclosed packing, substantially as set forth.

In witness whereof I have hereunto signed my name in the presence of two subscribing witnesses.

WILLIAM WALTER HOPKINSON.

Witnesses:
JOHN C. NEWBURN,
JOSEPH T. HOPKINSON.